(12) United States Patent
Desbois et al.

(10) Patent No.: US 6,410,654 B1
(45) Date of Patent: Jun. 25, 2002

(54) HIGHLY RIGID, HIGH-TENACITY IMPACT-RESISTANT POLYSTYRENE

(75) Inventors: Philippe Desbois, Maikammer; Christian Schade, Ludwigshafen; Hermann Gausepohl, Mutterstadt; Volker Warzelhan, Weisenheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/719,818

(22) PCT Filed: Jun. 23, 1999

(86) PCT No.: PCT/EP99/04343

§ 371 (c)(1),
(2), (4) Date: Dec. 18, 2000

(87) PCT Pub. No.: WO99/67308

PCT Pub. Date: Dec. 29, 1999

(30) Foreign Application Priority Data

Jun. 24, 1998 (DE) .......................... 198 28 104

(51) Int. Cl.$^7$ .............................. C08F 4/46; C08F 4/52; C08F 279/04

(52) U.S. Cl. .................... 525/316; 525/244; 525/247; 525/249; 525/89; 526/173; 526/176; 526/347.2

(58) Field of Search ................................. 525/316, 244, 525/247, 249, 89; 526/347.2, 173, 176

(56) References Cited

U.S. PATENT DOCUMENTS

| 4,153,647 A | | 5/1979 | Glukhovskoi |
| 5,247,020 A | * | 9/1993 | Nakano et al. .............. 525/249 |
| 5,278,232 A | * | 1/1994 | Seelert et al. .................. 525/71 |

FOREIGN PATENT DOCUMENTS

| DE | 42 35 978 | 4/1994 |
| WO | 96/18666 | 6/1996 |
| WO | 98/07766 | 2/1998 |
| WO | 98/31721 | 7/1998 |
| WO | 99/40135 | 8/1999 |
| WO | 99/40136 | 8/1999 |

\* cited by examiner

*Primary Examiner*—James J. Seidleck
*Assistant Examiner*—Olga Asinovsky
(74) *Attorney, Agent, or Firm*—Keil & Weinkauf

(57) ABSTRACT

An anionically polymerized impact-modified polystyrene has a yield stress of at least 24 MPa, measured at 23° C. to DIN 53455 and a hole impact strength of at least 11 kJ/m$^2$, measured at 23° C. to DIN 53753, measured in each case on a specimen produced to ISO 3167. A preparation process is described.

13 Claims, No Drawings

HIGHLY RIGID, HIGH-TENACITY IMPACT-RESISTANT POLYSTYRENE

The invention relates to an anionically polymerized, impact-modified polystyrene with high stiffness and toughness, and also to a process for its preparation.

There is a variety of continuous and batch processes in solution or suspension for preparing impact-modified polystyrene, As described in Ullmanns Enzyklopädie, Vol A21, VCH Verlausesellschaft Weinheim 1992, pp. 615–625. In these processes a rubber, usually polybutadiene, is dissolved in monomeric styrene and the styrene is free-radical polymerized via thermal or peroxidic initiation. Besides homopolymerization of styrene, graft polymerization of styrene onto polybutadiene also takes place. Consumption of the monomeric styrene with the formation of polystyrene gives rise to a "phase inversion". The properties of the impact-modified polystyrene are determined by the morphology, the particle size and the particle size distribution of the disperse rubber particles. These are dependent on a variety of process parameters, such as the viscosity of the rubber solution and sheer forces during stirring.

Processes for preparing thermoplastic molding compositions via anionic polymerization of styrene in the presence of styrene-butadiene block copolymers are disclosed, for example, in DE-A-42 35 978, WO 96/18666 or U.S. Pat. No. 4,153,647. The resultant impact-modified products Slave lower residual monomer and oligomer contents than products obtained by free-radical polymerization. However, anionically polymerized products generally have inadequate toughness.

WO 98/07766 describes the Continuous preparation of impact-modified molding compositions using styrene-butadiene rubbers. The rubbers were polymerized anionically using retardant additives, such as alkyl compounds of alkaline-earth metals, of zinc or of aluminum in styrene as solvent. However, their butadiene blocks always-contain small amounts of copolymerized styrene.

Since the reaction mechanisms for free-radical and anionic polymerization of styrene differ, the process parameters known for free-radical preparation of impact-modified polystyrene are not directly transferable to the anionic polymerization of styrene in the presence of rubbers. For example, exclusive use of homopolybutadiene is not possible since no graft reactions occur in the anionic polymerization of styrene.

It is an object of the present invention to provide an anionically polymerized, impact-modified polystyrene with high stiffness and toughness. The impact-modified polystyrene should be low in residual monomers and residual oligomers and have a low ethyl benzene content. A further object was to find an anionically polymerized impact-modified polystyrene with cell-particle morphology, and also a process for its preparation.

We have found that this object is achieved by obtaining a novel impact-modified polystyrene via anionic polymerization of styrene in the presence of a rubber, the rubber used being a styrene-butadiene-styrene three-block copolymer with a styrene content of from 5 to 75% by weight, preferably from 25 to 50% by weight.

A specimen produced to ISO 3167 has a yield stress of at least 24 MPa, measured at 23° C. to DIN 53455 and a hole notched impact strength of at least 11 kJ/m$^2$, measured at 23° C. to DIN 53753.

The specimens produced to ISO 3167 by injection molding preferably have a yield stress of at least 27 MPa, particularly preferably from 30 to 50 MPa, measured at 23° C. to DIN 53455 and a hole notched impact strength of at least 13 kJ/m$^2$, particularly preferably from 15 to 30 kJ/m$^2$, measured at 23° C. to DIN 53753. The values for yield stress are generally from 20 to 30% lower for compression-molded specimens (e.g. DIN 16770, Part 1) than the values for injection-molded specimens, and the hole notched impact strength values are generally from 30 to 40% lower.

The ratio of yield stress to hole notched impact strength generally has a numerical value of at least 1.5, preferably at least 2.

The disperse soft phase of the novel impact-modified polystyrene preferably comprises a styrene-butadiene block copolymer and has cell-particle morphology.

The novel impact-modified polystyrene may be obtained by anionic polymerization of styrene in the presence of a rubber. The rubber used here comprises a styrene-butadiene-styrene three-block copolymer with a styrene content of from 5 to 75% by weight, preferably from 25 to 50% by weight or a styrene-butadiene two-block copolymer or a mixture of a styrene-butadiene two-block copolymer with a homopolybutadiene, where the styrene-butadiene two-block copolymer or, respectively, the mixture has a styrene content of from 25 to 75% by weight, preferably from 30 to 50% by eight.

It is particularly preferable for the rubber used to comprise an asymmetric styrene-butadiene-styrene three-block copolymer $S_1$-B-$S_2$, where $S_1$ is a styrene block with a weight-average molar ass $M_w$ of from 5000 to 100000 g/mol, preferably from 10000 to 40000 g/mol, B is a butadiene block with a weight-average molar mass $M_w$ of from 12000 to 500000 g/mol, preferably from 70000 to 250000 g/mol and $S_2$ is a styrene block with a weight-average molar mass $M_w$ of from 30000 to 300000 g/mol, preferably from 50000 to 200000 g/mol.

The residual butadiene content of the homopolybutadiene and the styrene-butadiene block copolymer used should be less than 200 ppm, preferably less than 50 ppm, in particular less than 5 ppm.

The rubber content, based on the impact-modified polystyrene, is usefully from 5 to 25% by weight.

The conversion, based on styrene in the hard matrix, is generally above 90%, preferably above 99%. The process may in principle also give complete conversion.

In place of styrene it is also possible to use other vinylaromatic monomers for the polymerization of the hard matrix or of the styrene blocks in the block copolymers. Examples of other suitable monomers are α-methylstyrene, p-methylstyrene, ethylstyrene, tert-butylstyrene, vinyltoluene, 1,2-diphenylethylene and 1,1-diphenylethylene, and mixtures. Particular preference is given to the use of styrene.

The rubbers may also comprise other dienes instead of butadiene, for example 1,3-pentadiene, 2,3-dimethylbutadiene, isoprene or mixtures of these.

The anionic polymerization initiators usually used are mono-, bi- or multifunctional alkyl, aryl or aralkyl compounds of alkali metals. Useful compounds are organo-lithium compounds, such as ethyl-, propyl-, isopropyl-, n-butyl-, sec-butyl-, tert-butyl-, phenyl-, diphenyl-, hexyl-, hexamethylenedi-, butadienyl-, isoprenyl- and polystyryllithium, or the multifunctioiial compounds 1,4-dilithiobutane, 1,4-dilithio-2-butene or 1,4-dilithiobenzene. The required amount of alkali metal organyl compound depends on the molecular weight desired and on the nature and amount of the other metal organyl compounds used, and also on the polymerization temperature. It is generally from 0.002 to 5 mol %, based on the total amount of monomers.

The polymerization may be carried out with or without a solvent. The polymerization usefully takes place in an aliphatic, isocyclic or aromatic hydrocarbon or hydrocarbon mixture, such as benzene, toluene, ethylbenzene, xylene, cumene, hexane, heptane, octane or cyclohexane. Preference is given to solvents with a boiling point above 95° C., particularly toluene.

Additives which reduce the polymerization rate, known as retarders, as described in WO 98/07766, may be added in order to control the reaction rate. Examples of suitable retarders are metal organyl compounds of an element of the second or third main group of the periodic table or the second transition group. Examples of organyl compounds which may be used are those of the elements Be, Mg, Ca, Sr, Ba, B, Al, Ga, In, Tl, Zn, Cd, Hg. Preference is given to the use of the magnesium and aluminum organyl compounds. For the purposes of the present invention, organyl compounds are the organometallic compounds of the elements mentioned having at least one metal-carbon a bond, in particular the alkyl or aryl compounds. The metal organyl compounds may also contain, on the metal, hydrogen, halogen or organic radicals bonded via heteroatoms, such as alcoholates or phenolates. The latter are obtainable, for example, by partial or complete hydrolysis, alcoholysis or aminolysis. It is also possible to use mixtures of different metal organyl compounds.

Suitable magnesium organyl compounds are those of the formula $R_2Mg$, where the radicals R, independently of one another, are hydrogen, halogen, $C_1$–$C_{20}$-alkyl or $C_6$–$C_{20}$-aryl. Preference is given to dialkylmagnesium compounds, in particular the ethyl, propyl, butyl, hexyl or octyl compounds which are available commercially. Particular preference is given to the use of (n-butyl) sec-butyl magnesium, which is soluble in hydrocarbons.

Aluminum organyl compounds which may be used are those of the formula $R_3Al$, where the radicals R, independently of one another, are hydrogen, halogen, $C_1$–$C_{20}$-alkyl or $C_6$–$C_{20}$-aryl. Preferred aluminum organyl compounds are the trialkylaluminum compounds, such as triethylaluminum, triisobutylaluminum, tri-n-butylaluminum, triisopropylaluminum and tri-n-hexylaluminum. Particular preference is given to the use of triisobutylaluminum. Other aluminum organyl compounds which may be used are those produced by partial or complete hydrolysis, alcoholysis, aminolysis or oxidation of alkylaluminum or aryl aluminum compounds. Examples of these are diethylaluminum ethoxide, diisobutylaluminum ethoxide, diisobutyl(2,6-di-tert-butyl-4-methylphenoxy)aluminum (CAS No. 56252-56-3), methylaluminoxane, isobutylated methylaluminoxane, isobutylaluminoxane, tetraisobutyldialuminoxane and bis(diisobutyl)aluminum oxide.

The polymerization of the styrene is particularly preferably carried out in the presence of a trialkylaluminum and/or dialkylmagnesium compound.

The retarders described do not generally act as polymerization initiators. However, it has been found that the polymerization of the hard matrix can be carried out without any other addition of an anionic polymerization initiator if direct use is made of a rubber solution which has been initiated via anionic polymerization using an anionic polymerization initiator and then terminated by chain-termination and/or by coupling. In this case the metal alkyl compounds, which otherwise only act as retarders, can initiate the polymerization of the hard matrix. This makes metering and control simpler than when an initiator/retarder mixture is used.

A magnesium content of from 0.1 to 100 mmol/kg and/or an aluminum content of from 0.01 to 50 mmol/kg, based in each case on the impact-modified polystyrene, does not generally significantly impair mechanical properties.

To increase elongation at break, from 0.1 to 10% by weight, preferably from 0.5 to 5% by weight, of mineral oil, based on the impact-modified polystyrene, may be added in the novel process.

The polymerization of the hard styrene matrix may be carried out batchwise or continuously in stirred-tank reactors, circulating reactors, tubular reactors, tower reactors or rotating disk reactors, as described in WO 97/07766.

The content of styrene monomers in the impact-modified polystyrene is generally not more than 50 ppm, preferably not more than 10 ppm, and the content of styrene dimers and of styrene trimers is not more than 500 ppm, preferably not more than 200 ppm, particularly preferably less than 100 ppm. The ethylbenzene content is preferably below 5 ppm.

It can be useful to achieve crosslinking of the rubber particles by using an appropriate temperature profile in a devolatolizer or vented extruder and/or by adding peroxides, in particular those with a high decomposition temperature, for example dicumyl peroxide.

Other conventional auxiliaries, such as stabilizers, lubricants, flame retardents, antistats, may be added to the novel polymers.

The novel impact-modified polystyrene is suitable for producing fibers, films or moldings.

EXAMPLES

Test methods:

The molecular weights and molecular weight distributions were determined by gel permeation chromatography (GPC) in tetrahydrofuran and evaluating the resultant chromatograms using calibration by polystyrene or by polybutadiene.

The styrene content and 1,2-vinyl content of the butadiene fraction in the rubber was determined by evaluating 1H nuclear resonance spectroscopic data.

For the mechanical and physical tests on the impact-modified polystyrenes, compression-molded (DIN 16770—Part 1) and, respectively, injection-molded (ISO 3167) specimens were produced. Yield stress and elongation at break were determined at 23° C. to DIN 53455. hole notched impact strength was determined to DIN 53753 at 23° C. on compression-molded test specimens of dimensions 50×6×4 mm (hole diameter: 3 mm) or on injection-molded test specimens of dimensions 80×10×4 mm. Unless stated otherwise, the tests were carried out on compression-molded test specimens.

Synthesis of Rubber Solutions

Example K1
(Styrene-butadiene Two-block Copolymer)

14 kg of dry toluene were charged to a stirred-tank reactor of 50 l capacity and mixed, with stirring, with 1610 g of butadiene. The mixture was heated to 40° C. and mixed at this temperature with 19.4 g of a 1.5 molar solution of sec-butyllithium in cyclohexane. Once the polymerization had started, the internal temperature rose to a maximum of 72° C. After 17 min. a further 2168 g of butadiene were added within a period of 15 min. at an internal temperature of from 66 to 77° C., and the mixture was stirred for a further 30 min. at 65° C. 2222 g of styrene were then added. The temperature had now risen to 71° C. After 60 min., 1.6 g of isopropanol were used for termination. The solution had a solids content of 30% by weight. Addition of 20 kg of styrene gave a rubber solution with a solids content of 17.5% by weight.

The resultant butadiene-styrene block copolymer had an average molecular weight of Mw=308,000 g/mol and a polydispersity Mw/Mn of 1.09 (determined by gel permeation chromatography, GPC, polystyrene calibration). The residual butadiene content was less than 10 ppm. The styrene content was 37%; 9% of the butadiene fraction of the rubber was of the 1,2-vinyl type (determined by 1H nuclear resonance spectroscopy). The solution viscosity of a 5.43% strength solution of the rubber in toluene was 42 mPas.

Example K2
(Mixture of Styrene-butadiene Two-block Copolymer and Homopolybutadiene)

14 kg of dry toluene were charged to a stirred-tank reactor of 50 l capacity and mixed, with stirring, with 1612 g of butadiene. The mixture was heated to 32° C. and mixed at this temperature with 17.4 g of a 1.33 molar solution of sec-butyllithium in cyclohexane. The solution was heated to 62° C. within a period of 20 min. A further 2813 g of butadiene were added at an internal temperature of from 62 to 79° C. within a period of 25 min. The mixture was stirred for a further 30 min. at 65° C. Some of the butadiene blocks produced were then coupled using 52 ml of a 2% strength by weight solution of ethyl acetate, and 1575 g of styrene were then added. The temperature had now risen to 69° C. After 60 min., 1.4 ml of isopropanol were used for termination. The solution had a solids content of 30% by weight. Addition of 20 kg of styrene gave a rubber solution with a solids content of 17.5% by weight. The resultant polymer mixture had bimodal distribution with a principal molar mass peak at Mp=329,000 g/mol and another peak at Mp=166,000 g/mol (GPC, polybutadiene calibration). The residual butadiene content was less than 10 ppm. The styrene content of the rubber isolated was 26%. 12% of the butadiene fraction of the rubber was of the 1,2-vinyl type (1H NMR). The solution viscosity of a 5.43% strength solution of the rubber in toluene was 97 mPas.

Examples K3 to K5 were carried out in a similar manner using, respectively, phenylacetylene, ethyl acetate and diethyl adipate as coupling agents. The parameters and results from the rubber solutions are given in Table 1:

TABLE 1

| Example | K2 | K3 | K4 | K5 |
| --- | --- | --- | --- | --- |
| Coupling agent or additive | Ethyl acetate | Phenyl-acetylene | Ethyl acetate | Diethyl adipate |
| Amount a) | 0.9 g | 1.0 g | 0.9 g | 0.5 g |
| Styrene fraction in the rubber | 25% | 30% | 15% | 20% |
| Solids content at the end of the reaction | 30% | 37% | 35% | 30% |
| Solids content after dilution with styrene | 17.5% | 17.5% | 17.5% | 12% |
| Solution viscosity (5.43% in toluene) | 97 mPas | 55 mPas | 101 mPas | 174 mPas | a) metered in as a 2% strength by weight solution in toluene

Example K6
(Mixture of Styrene-butadiene Two-block Copolymer, and Homopolybutadiene)

20 kg of dry toluene were charged to a stirred-tank reactor of 50 l capacity and mixed, with stirring, with 1000 g of butadiene. The mixture was heated to 40° C. and mixed with 20.8 ml of a 0.24 molar solution of sec-butyllithium in cyclohexane. The solution was heated to 64° C. After 100 min., 0.76 ml of isopropanol were added to the reaction mixture.

A further 2222 g of butadiene and 1778 g of styrene, and also 46.3 ml of a 0.24 molar solution of sec-butyllithium, were added at an internal temperature of 68° C. The mixture was stirred for a further 128 min. at 60–65° C., and 1.7 ml of isopropanol were then added to the reaction mixture. At this juncture the solution had a solids content of 20% by weight, and was diluted to a solids content of 15% by weight by adding 8.3 kg of styrene. GPC analysis of the resultant rubber mixture showed a bimodal distribution with a principal molar mass peak Mp at 370,000 g/mol and another peak at Mp=210,000 g/mol. The respective block lengths are 210,000 and 210,000/160,000 g/mol. The residual butadiene content was below 10 ppm. $^1$H NMR gave the butadiene fraction in the rubber as 12% in the 1,2-vinyl form. The solution viscosity of a 5.43% strength solution of the rubber in toluene was 88 mPas.

Example K7
(Mixture of Styrene-butadiene Two-block Copolymer and Homopolybutadiene)

20 kg of dry toluene were charged to a stirred-tank reactor of 50 l capacity and mixed, with stirring, with 1300 g of butadiene. The mixture was heated to 40° C. and mixed at this temperature with 20.8 ml of a 0.24 molar solution of sec-butyllithium in cyclohexane. The solution was heated to 66° C. After 100 min., 0.76 ml of isopropanol were added to the reaction mixture.

A further 2010 g of butadiene and 1333 g of styrene, and also 46.3 ml of a 0.24 molar solution of sec-butyllithium, were added at an internal temperature of 64° C. The mixture was stirred for a further 128 min. at 60–63° C., and 1.7 ml of isopropanol were then added to the reaction mixture. At this juncture the solution had a solids content of 20% by weight, and a rubber solution with a solids content of 15% by weight was obtained by adding 8.3 kg of styrene. GPC analysis of the resultant polymer mixture showed a bimodal distribution with a principal molar mass peak Mp at 310 000 g/mol and another peak at Mp=260,000 g/mol. The respective block lengths are 260,000 and 190,000/120,000 g/mol. The residual butadiene content was below 10 ppm. $^1$H NMR gave the butadiene fraction in the rubber as 11% in the 1,2-vinyl form. The solution viscosity of a 5.43% strength solution of the rubber in toluene was 81 mPas.

Example K8
(S-P-S Three-block Copolymer)

13.8 kg of dry toluene in a stirred-tank reactor of 50 l capacity were mixed, with stirring, with 228 g of styrene and 14.2 ml of a 1.33 molar solution of sec-butyllithium in cyclohexane. The solution was heated to 50° C. within a period of 15 min. 3570 g of butadiene were then added within a period of 25 min., whereupon the internal temperature rose to 74° C. The mixture was stirred for a further 30 min. at 65° C. 2100 g of styrene were then added. The temperature had now risen to 70° C. After 60 min., 1.4 ml of isopropanol were added to the reaction mixture. At this juncture the solution had a solids content of 30% by weight. The solids content was adjusted to 15% by weight by adding styrene to the mixture. GPC analysis of the resultant polymer mixture showed a distribution with a principal molar mass peak at Mp=296,000 g/mol and a shoulder at Mp=225,000 g/mol, using polybutadiene calibration. The residual butadiene content was less than 10 ppm. 1H NMR gave the styrene content of the rubber isolated as 39%. 11% of the butadiene fraction of the rubber was of the 1,2-vinyl type. The solution viscosity of a 5.43% strength solution of the rubber in toluene was 54 mPas.

Example K9
(S-B-S-Three-block Copolymer with Block-length Ratio 10/150/70)

13.8 kg of dry toluene were charged to a stirred-tank reactor of 50 l capacity, heated to 40° C. and mixed at this temperature with 119.9 ml of a 0.24 molar solution of sec-butyllithium in cyclohexane. The solution was mixed, with stirring, with 287 g of styrene and heated to 45° C. within a period of 60 min. A further 3230 g of butadiene were added at an internal temperature of 52.5° C. within a period of 39 min. The mixture was stirred for a further 51 min. at 52.5° C. 2022 g of styrene were then added. By this time the temperature had risen to 56° C. After 93 min., 2.2 ml of isopropanol were added to the reaction mixture. At this juncture the solution had a solids content of 30% by weight. A rubber solution with a solids content of 11.5% by weight was obtained by adding 30 kg of styrene. GPC analysis of the resultant polymer mixture showed a distribution with a principal molar mass peak Mp at 230,000 g/mol. The respective black lengths were 100,000/150,000/70,000 g/mol. The residual butadiene content was less than 10 ppm. $^1$H NMR gave the butadiene fraction of the rubber as 12% in the 1,2-vinyl form. The solution viscosity of a 5.43% strength solution of the rubber in toluene was 39.3 mPas.

Example K10
(S-B-S Three-block Copolymer with Block Length Ratio 15/180/110)

30 13.8 kg of dry toluene were charged to a stirred-tank reactor of 50 l capacity, heated to 42° C. and mixed at this temperature with 91 ml of a 0.24 molar solution of sec-butyllithium in cyclohexane. The solution was mixed, with stirring, with 320 g of styrene and heated to 42° C. within a period of 68 min. A further 3570 g of butadiene were added at an internal temperature of 44° C. within a period of 80 min. The mixture was stirred for a further 8 min. at 65° C. 2008 g of styrene were then added. By this time the temperature had risen to 46° C. After 73 min., 1.7 ml of isopropanol were added to the reaction mixture. At this juncture the solution had a solids content of 30% by weight. A rubber solution with a solids content of 16% by weight was obtained by adding 17.2 kg of styrene. GPC analysis of the resultant polymer mixture showed a distribution with a principal molar mass peak Mp at 305,000 g/mol. The respective block lengths were 15,000/ 180,000/110,000 g/mol. The residual butadiene content was less than 10 ppm. $^1$H NMR gave the butadiene fraction of the rubber as 11% in the 1,2-vinyl form. The solution viscosity of a 5.43% strength solution of the rubber in toluene was 57.0 mPas.

Example K11
(S-B-S Three-block Copolymer with Block Length Ratio 15/175/130)

13.8 kg of dry toluene were charged to a stirred-tank reactor of 50 l capacity, heated to 40° C. and mixed at this temperature with 86.9 ml of a 0.24 molar solution of sec-butyllithium in cyclohexane. The solution was mixed, with stirring, with 300 g of styrene and heated to 41° C. within a period of 67 min. A further 3570 g of butadiene were added at an internal temperature of 46° C. within a period of 65 min. The mixture was stirred for a further 30 min. at 65° C. 2028 g of styrene were then added. By this time the temperature had risen to 46° C. After 117 min., 1.6 ml of isopropanol were added to the reaction mixture . At this juncture the solution had a solids content of 30% by weight. A rubber solution with a solids content of 16% by weight was obtained by adding 17.2 kg of styrene. GPC analysis of the resultant polymer mixture showed a distribution with a principal molar mass peak Mp at 320,000 g/mol. The respective S-B-S block lengths were 15 000/175, 000/130,000 g/mol. The residual butadiene content was less than 10 ppm. $^1$H NMR gave the butadiene fraction of the rubber as 11% in the 1,2-vinyl form. The solution viscosity of a 5.43% strength solution of the rubber in toluene was 82.2 mPas.

Example K12
(S-B-S Three-block Copolymer with Block Length Ratio 14/230/95)

13.8 kg of dry toluene were charged to a stirred-tank reactor of 50 l capacity, heated to 40° C. and mixed at this temperature with 75.4 ml of a 0.24 molar solution of sec-butyllithium in cyclohexane. The solution was mixed, with stirring, with 260 g of styrene and heated to 40° C. within a period of 73 min. A further 3570 g of butadiene were added at an internal temperature of 44° C. within a period of 40 min. The mixture was stirred for a further 45 min. at 44° C. 2068 g of styrene were then added. By this time the temperature had risen to 56° C. After 110 min., 1.4 ml of isopropanol were added to the reaction mixture. At this juncture the solution had a solids content of 30% by weight. The rubber solution was diluted to a solids content of 15.9% by weight by adding 17.2 kg of styrene. GPC analysis of the resultant polymer mixture showed a distribution with a principal molar mass peak Mp at 339,000 g/mol. The respective block lengths were 14,000/230 000/95,000 g/mol. The residual butadiene content was less than 10 ppm. $^1$H NMR gave the butadiene fraction of the rubber as 11% in the 1,2-vinyl form. The solution viscosity of a 5.43% strength solution of the rubber in toluene was 74.5 mPas.

Example K13
(S-B-S Three-block Copolymer with Block Length Ratio 15/120/70)

13.8 kg of dry toluene were charged to a stirred-tank reactor of 50 l capacity, heated to 40° C. and mixed at this temperature with 119.9 ml of a 0.24 molar solution of sec-butyllithium in cyclohexane. The solution was mixed, with stirring, with 425 g of styrene and heated to 45° C. within a period of 60 min. A further 3450 g of butadiene were added at an internal temperature of 52.5° C. within a period of 39 min. The mixture was stirred for a further 51 min. at 52.50° C. 2022 g of styrene were then added. By this time the temperature had risen to 56° C. After 93 min., 2.2 ml of isopropanol were added to the reaction mixture. At this juncture the solution had a solids content of 30% by weight. A rubber solution with a solids content of 16.0% by weight was obtained by adding 17.2 kg of styrene. GPC analysis of the resultant polymer mixture showed a distribution with a principal molar mass peak Mp at 205,000 g/mol. The respective S-B-S block lengths were 15 000/120,000/70,000 g/mol. The residual butadiene content was less than 10 ppm. $^1$H NMR gave the butadiene fraction of the rubber as 12% in the 1,2-vinyl form. The solution viscosity of a 5.43% strength solution of the rubber in toluene was 28.7 mPas.

HIPS Syntheses

Examples H1 to H5 are not inventive.

Example H1

A double-walled 3 l stirred-tank reactor with a standard anchor stirrer was used for the continuous polymerization. The reactor was designed for a pressure of 60 bar and was temperature-controlled with a heat-transfer medium for isothermal polymerization.

394 g/h of styrene, 686 g/h of the rubber solution from Example K1 and 17 g/h of a 0.16 molar solution of (n-butyl)

(sec-butyl)magnesium in heptane/toluene (1:4 parts by weight) were metered continuously, with stirring at 100 rpm, into the stirred-tank reactor, and stirred at a constant temperature of the mixture of 79° C.

The material discharged from the stirred-tank reactor was conveyed onward into two agitated 4-liter tower reactors arranged in series. The first tower reactor was operated at an internal temperature of 92° C. In the second tower reactor the temperature was adjusted by means of two heating zones of equal length arranged in series in such a way that the internal temperature at the end of the first zone was 124° C. and at the end of the second zone was 158° C. At the exit from the tower reactor the polymerization mixture was mixed in a mixer with 5 g/h of methanol and then passed through a tubular section heated to 260° C. and passed, with pressure reduction, via a pressure-control valve into a low-pressure vessel maintained at 25 mbar. The melt was discharged using a screw and pelletized.

After a few hours a stable equilibrium condition became established in all parts of the system. The pressure drop across the entire system was 2.9 bar. The solids content was 26% by weight at the exit from the stirred-tank reactor, 58% by weight at the exit from the first tower reactor, and 73% by weight at the exit from the second tower reactor, corresponding to 100% monomer conversion. The polystyrene matrix had a molecular weight Mw of 164,500 g/mol and a polydispersity Mw/Mn of 2.95. The distribution was monomodal. Determinations on the impact-modified polystyrene gave a content of less than 5 ppm of styrene, less than 5 ppm of ethylbenzene and 83 ppm of toluene. The impact-modified polystyrene had a yield stress of 27 N/mm$^2$, elongation at break of 25% and hole notched impact strength of 12 kJ/m$^2$.

The vapors collected in the devolatilization unit were utilized, after distillation, for another rubber synthesis of Example K1.

Example H2

511 g/h of styrene, 488 g/h of the rubber solution from Example K2 and 17.4 g/h of a 0.16 molar solution of (n-butyl)(sec-butyl)magnesium in heptane/toluene (1:4 parts by weight), were metered continuously, with stirring at 100 rpm, into the stirred-tank reactor of Example H1, and stirred at a constant temperature of the mixture of 86° C.

The material discharged from the stirred-tank reactor was conveyed onward into a double-walled tubular reactor with an internal diameter of 29.7 mm and a length of 2100 mm. The tubular reactor was designed for a pressure of up to 100 bar and for a temperature of up to 350° C. The tubular reactor was temperature-controlled via a cocurrently conducted heat-transfer medium, and the temperature of the polymerization mixture was determined via three temperature sensors distributed uniformly over the reaction path. The temperature of the heat-transfer medium at the entry to the tubular reactor was 105° C. The highest temperature of the polymerization solution was achieved at the end of the tubular reactor, with 184° C.

After the polymerization mixture had left the tubular reactor a 20% strength by weight solution of methanol in toluene was added at 10 ml/h using a HPLC pump, and a downstream tubular section with a static mixture was used to homogenize the mixture. The polymer melt was passed, with pressure reduction, via a throttle valve into a devolatilization vessel maintained at 20 mbar, drawn off using a screw pump, extruded and pelletized.

After a short time a stable equilibrium condition became established in all parts of the system. The pressure drop across the entire system was 2.2 bar. The solids content was 41% by weight at the exit from the stirred-tank reactor and 79% by weight at the exit from the tubular reactor, corresponding to 100% monomer conversion. The polystyrene matrix had a molecular weight Mw of 169,000 g/mol and a polydispersity Mw/Mn of 2.62. Determination gave a content of less than 5 ppm of styrene, less than 5 ppm of ethylbenzene and 102 ppm of toluene. The impact-modified polystyrene had a yield stress of 29 N/mm$^2$, elongation at break of 20% and hole notched impact strength of 11 kJ/m$^2$.

The vapors collected in the devolatilization unit were utilized in Example K2, after distillation, for another rubber synthesis.

Example H3

The reactor used was a double-walled tubular reactor with an internal diameter of 29.7 mm and a length of 4200 mm. The tubular reactor was designed for a pressure of up to 100 bar and for a temperature of up to 350° C. The tubular reactor was divided into two zones of equal length, each temperature-controlled via a cocurrently conducted heat-transfer medium. The temperatures of, respectively, the polymerization mixture and the heat-transfer medium were determined via three temperature sensors uniformly distributed over the reaction path.

387 g/h of styrene, 588 g/h of the rubber solution from Example K3 and 17.5 g/h of an initiator solution were metered continuously into the tubular reactor. 100 g of the initiator solution were composed of 24 g of a 0.8 molar solution of (n-butyl)(sec-butyl)magnesium in heptane, 1 g of a 1.6 M solution of sec-butyllithium in cyclohexane and 75 g of toluene. The temperature of the heat-transfer medium at the point of entry into the first reactor section was 100° C. The temperature of the polymerization solution at the end of the first tubular reactor section was 134° C. The temperature of the heat-transfer medium at the entry into the second reactor section was 80° C. The temperature of the polymerization solution at the end of the second tubular reaction section averaged 183° C.

After the polymerization mixture had left the tubular reactor a 20% strength by weight solution of methanol in toluene was added at 10 ml/h using a HPLC pump, and a downstream tubular section with a static mixture was used to homogenize the mixture. The polymer melt was passed, with pressure reduction, via a throttle valve into a devolatilization vessel maintained at 17 mbar, drawn off using a screw pump, extruded and pelletized.

After a short time stable conditions became established in all parts of the system. The pressure drop across the entire system was 2.1 bar. The solids content was 31% by weight at the end of the first section of the tubular reactor and 80% by weight at the exit from the tubular reactor. The polystyrene matrix had a molecular weight Mw of 185,000 g/mol and a polydispersity Mw/Mn of 2.12. Determination gave a content of 12 ppm of styrene, less than 5 ppm of ethylbenzene and 87 ppm of toluene. The impact-modified polystyrene had a yield stress of 26 N/mm$^2$, elongation at break of 23% and hole notched impact strength of 11 kJ/m$^2$.

The vapors collected in the devolatilization unit were utilized as in Example K3, after distillation, for another rubber synthesis.

Comparative Example 1c 538 g/h of the rubber solution from Example K4 and 682 g/h of styrene were metered continuously, with stirring at 100 rpm, into a 3-liter stirred-tank reactor operated under pressure and equipped with an anchor stirrer. Separately from this, a mixture of 25 g/h of a 0.32 molar solution of sec-butyllithium in cyclohexane/toluene (weight ratio 1:4) and 24 g/h of a 4% strength by weight triisobutylaluminum solution in toluene were metered into the reactor. To prepare this mixture the components were mixed continuously in a tubular section of 12.5 ml capacity and passed into the reactor. The stirred-tank reactor was controlled by a thermostat to an internal temperature of 109° C.

The solution was conveyed onward into a 4-liter agitated tower reactor, operated at an internal temperature of 110° C. The material discharged from the reactor was introduced into a second 4-liter tower reactor provided with two identically sized heating zones. The first zone was controlled to an internal temperature of 121° C. and the second to 158° C. The material discharged from the reactor was mixed with 20 g/h of a 10% strength by weight solution of methanol in toluene, passed through a mixer and then a tubular section heated to 260° C., and, with pressure reduction, via a pressure-control valve into a low-pressure vessel operated at 25 mbar. The melt was discharged using a screw, and pelletized.

After a few hours constant operating conditions became established. The solids content was 29% by weight at the exit from the first reactor and 56% by weight after the first tower. Quantitative conversion was found at the exit from the continuous system. The pressure drop across the entire system was 2.3 bar. The polystyrene matrix had a molecular weight Mw of 162,400 g/mol and polydispersity Mw/Mn of 2.68. The distribution was monomodal. Determination gave a content of less than 5 ppm of styrene, less than 5 ppm of ethylbenzene and 112 ppm of toluene. The impact-modified polystyrene had a yield stress of 17 N/mm$^2$, elongation at break of 35% and hole notched impact strength of 14 kJ/m$^2$.

The vapors collected in the devolatilization unit were utilized, after distillation, for another rubber synthesis as in Example K4.

Comparative Example 2c 1252 g/h of the rubber solution from Example K5 and 603 g/h of styrene were metered continuously, with stirring at 100 rpm, into a 3-liter stirred-tank reactor operated under pressure and equipped with an anchor stirrer. Separately from this, a mixture of 37 g/h of a 0.32 molar solution of sec-butyllithium in cyclohexane/toluene (weight ratio 1:4) and 18 g/h of an 8% strength by weight triisobutylaluminum solution in toluene were metered into the reactor. For this the components were mixed continuously in a tubular section of 12.5 ml capacity and passed into the reactor. The stirred-tank reactor was controlled by a thermostat to an internal temperature of 112° C.

The solution was conveyed onward into a 4-liter agitated tower reactor, provided with two identically sized heating zones. The first zone was controlled to an internal temperature of 125° C. and the second to 172° C. The material discharged from the reactor was mixed with 20 g/h of a 10% strength by weight solution of methanol in toluene, passed through a mixer and then a tubular section heated to 260° C., and, with pressure reduction, via a pressure-control valve into a low-pressure vessel operated at 25 mbar. The melt was discharged using a screw, and pelletized.

After a short time constant operating conditions became established. The solids content was 36% by weight at the exit from the first reactor. Quantitative conversion was found at the exit from the continuous system. The polystyrene matrix had a molecular weight Mw of 171,000 g/mol and polydispersity Mw/Mn of 2.83. The distribution was monomodal. Determination gave a content of less than 5 ppm of styrene, less than 5 ppm of ethylbenzene and 96 ppm of toluene. The impact-modified polystyrene had a yield stress of 20 N/mm$^2$, elongation at break of 36% and hole notched impact strength of 15 kJ/m$^2$.

The vapors collected in the devolatilization unit were utilized, after distillation, for another rubber synthesis as in Example K5.

Example H4

A double-walled 1.9 l stirred-tank reactor with a standard anchor stirrer was used for the continuous polymerization. The reactor was designed for a pressure of 25 bar and was temperature-controlled with a heat-transfer medium for isothermal polymerization. 545 g/h of styrene, 625 g/h of the rubber solution from Example K6 and 15 g/h of a 0.8 molar solution of (n-butyl)(sec-butyl)magnesium in heptane, which had been diluted with toluene in a weight ratio of 1:4, were metered continuously into the stirred-tank reactor, with stirring at 100 rpm, and the mixture was stirred at a constant temperature of 96.6° C.

The solution was conveyed onward into a 4-liter tower reactor provided with two heating zones of equal size. The internal temperature was controlled to 125.7° C. in the first zone and 160.2° C. in the second zone. The discharge from the reactor was mixed with 11 g/h of a 50% strength by weight solution of methanol in water, and passed through a mixer and then through a tubular section heated to 240° C., and then passed, with pressure reduction, via a pressure-control valve into a low-pressure vessel operated at 10 mbar. The melt was discharged using a screw and pelletized.

After a short time constant operating conditions became established. The solids content at the exit from the first reactor was 35% by weight. Quantitative conversion was found at the exit from the continuous system. The polystyrene matrix had a molar mass Mw of 171,000 g/mol and a polydispersity Mw/Mn of 3.34. The distribution was monomodal.

The styrene content and ethylbenzene content determined were each below 5 ppm. The material had a yield stress of 24 N/mm$^2$ a hole notched impact strength of 11.1 kJ/m$^2$, a heat distortion temperature (Vicat B/50) of 91.6° C. and a melt flow index of 6.2 cm$^3$/10 min. at 200° C.

Example H5

A double-walled 1.9 l stirred-tank reactor with a standard anchor stirrer was used for the continuous polymerization. The reactor was designed for a pressure of 25 bar and was temperature-controlled with a heat-transfer medium for isothermal polymerization. 530 g/h of styrene, 662 g/h of the rubber solution from Example K7 and 14 g/h of a 0.8 molar solution of (n-butyl)(sec-butyl)magnesium in heptane, which had been diluted with toluene in a weight ratio of 1:4, were metered continuously into the stirred-tank reactor, with stirring at 100 rpm, and the mixture was stirred at a constant temperature of 93.2° C.

The solution was conveyed onward into a 4-liter tower reactor provided with two heating zones of equal size. The internal temperature was controlled to 125.7° C. in the first zone and 160.2° C. in the second zone. The discharge from the reactor was mixed with 11 g/h of a 50% strength by weight solution of methanol in water, and passed through a mixer and then through a tubular section heated to 240° C., and then passed, with pressure reduction, via a pressure-control valve into a low-pressure vessel operated at 10 mbar. The melt was discharged using a screw and pelletized.

After a short time constant operating conditions became established. The solids content at the exit from the first reactor was 35% by weight. Quantitative conversion was found at the exit from the continuous system. The polystyrene matrix had a molar mass Mw of 166,000 g/mol and a polydispersity Mw/Mn of 3.30. The distribution was monomodal.

The styrene content and ethylbenzene content determined were each below 5 ppm. The material had a yield stress of 25 N/mm$^2$ a hole notched impact strength of 12 kJ/m$^2$, a heat distortion temperature (Vicat B/50) of 89° C. and a melt flow index of 5.5 cm$^3$/10 min. at 200° C.

Example H6

A double-walled 1.9 l stirred-tank reactor with a standard anchor stirrer was used for the continuous polymerization. The reactor was designed for a pressure of 60 bar and was temperature-controlled with a heat-transfer medium for isothermal polymerization.

280 g/h of styrene, 796 g/h of the rubber solution from Example K8 and 19 g/h of a 0.16 molar solution of (n-butyl)(sec-butyl)magnesium in heptane/toluene (weight ratio 1:4) were metered continuously into the stirred-tank reactor, with stirring at 100 rpm, and the mixture was stirred at a constant temperature of 94° C.

The material discharged from the stirred-tank reactor was conveyed onward into two agitated 4-liter tower reactors arranged in series. The first tower reactor was operated at an internal temperature of 102° C. In the second tower reactor the temperature was adjusted by means of two heating zones of equal length arranged in series in such a way that the internal temperature at the end of the first zone was 122° C. and at the end of the second zone was 160° C. At the exit from the tower reactor the polymerization mixture was mixed in a mixer with 5 g/h of a 1:1 methanol/water mixture and then passed through a tubular section heated to 260° C. and passed, with pressure reduction, via a pressure-control valve into a low-pressure vessel operated at 25 mbar. The melt was discharged using a screw and pelletized.

After a few hours a stable equilibrium condition became established in all parts of the system. The pressure drop across the entire system was 2.8 bar. The solids content was 37% by weight at the exit from the stirred-tank reactor, and 58% by weight at the exit from the first tower reactor. Quantitative conversion was found at the exit from the second tower reactor. The polystyrene matrix had a molar mass $M_w$ of 152,000 g/mol and polydispersity $M_w/M_n$ of 2.62. The distribution was monomodal. Determinations gave a content of less than 5 ppm of styrene, less than 5 ppm of ethylbenzene and 52 ppm of toluene. The material had a yield stress of 28 N/mm$^2$, hole notched impact strength of 13 kJ/m$^2$, heat distortion temperature (Vicat B/50) of 94° C. and melt volume rate MVR at 200/5 (ISO 1133) of 3.9 cm$^3$/10 min. An electron micrograph showed cellular particle morphology. The average particle diameter was 3.2 µm.

Example H7

A double-walled 1.9 l stirred-tank reactor with a standard anchor stirrer was used for the continuous polymerization. The reactor was designed for a pressure of 25 bar and was temperature-controlled with a heat-transfer medium for isothermal polymerization. 71 g/h of styrene, 968 g/h of the rubber solution from Example K9 and 15 g/h of a 0.8 molar solution of (n-butyl)(sec-butyl)magnesium in heptane, which had been diluted with toluene in a weight ratio of 1:4 were metered continuously into the stirred-tank reactor, with stirring at 100 rpm, and the mixture was stirred at a constant temperature of 93.0° C.

The solution was conveyed onward into a 4-liter tower reactor provided with two heating zones of equal size. The internal temperature was controlled to 121° C. in the first zone and 161° C. in the second zone. The discharge from the reactor was mixed with 11 g/h of a 50% strength by weight solution of methanol in water, and passed through a mixer and then through a tubular section heated to 240° C., and then passed, with pressure reduction, via a pressure-control valve into a low-pressure vessel operated at 10 mbar. The melt was discharged using a screw and pelletized.

After a short time constant operating conditions became established. The solids content at the exit from the first reactor was 35% by weight. Quantitative conversion was found at the exit from the continuous system. The polystyrene matrix had a molar mass Mw of 187,000 g/mol and a polydispersity Mw/Mn of 2.83. The distribution was monomodal.

The styrene content and ethylbenzene content determined were each below 5 ppm. The material had a yield stress of 25.4 N/mm$^2$, a hole notched impact strength of 18.1 kJ/m$^2$, a heat distortion temperature (vicat B/50) of 92.4° C. and a melt flow index of 4.7 cm$^3$/10 min. at 200° C.

Example H8

A double-walled 1.9 l stirred-tank reactor with a standard anchor stirrer was used for the continuous polymerization. The reactor was designed for a pressure of 25 bar and was temperature-controlled with a heat-transfer medium for isothermal polymerization. 381 g/h of styrene, 659 g/h of the rubber solution from Example K10 and 13.6 g/h of a 0.8 molar solution of (n-butyl)(sec-butyl)magnesium in heptane, which had been diluted with toluene in a weight ratio of 1:4 were metered continuously into the stirred-tank reactor, with stirring at 100 rpm, and the mixture was stirred at a constant temperature of 95.2° C.

The solution was conveyed onward into a 4-liter tower reactor provided with two heating zones of equal size. The internal temperature was controlled to 129° C. in the first zone and 160° C. in the second zone. The discharge from the reactor was mixed with 11 g/h of a 50% strength by weight solution of methanol in water, and passed through a mixer and then through a tubular section heated to 240° C., and then passed, with pressure reduction, via a pressure-control valve into a low-pressure vessel operated at 10 mbar. The melt was discharged using a screw and pelletized.

After a short time constant operating conditions became established. The solids content at the exit from the first reactor was 35% by weight. Quantitative conversion was found at the exit from the continuous system. The polystyrene matrix had a molar mass Mw of 173 000 g/mol and a polydispersity Mw/Mn of 3.14. The distribution was monomodal.

The styrene content and ethylbenzene content determined were each below 5 ppm.

Examples H8-1 and H8-2 were carried out analogously using mineral oil as additive into the mixer downstream of the tower reactor. Parameters for conduct of the experiment and properties of the resultant polymers are given in Table 2.

TABLE 2

| Example | | H8 | H8-1 | H8-2 |
|---|---|---|---|---|
| Mineral oil content (based on impact-modified polystyrene) | [%] | 0% | 1% | 2% |
| Yield stress | [N/mm$^2$] | 28 | 27.0 | 24.7 |
| Elongation at break | [%] | 7 | 17.0 | 21.0 |
| hole notched impact strength | [kJ/m$^2$] | 12 | 14.1 | 15.8 |
| Melt volume rate | [cm$^3$/10 min.] | 4 | 4.2 | 4.7 |
| Heat distortion temperature Vicat B/50 softening point | [° C.] | 94 | — | 90.0 |

Example H9

A double-walled 1.9 l stirred-tank reactor with a standard anchor stirrer was used for the continuous polymerization. The reactor was designed for a pressure of 25 bar and was temperature-controlled with a heat-transfer medium for isothermal polymerization. 368 g/h of styrene, 649 g/h of the rubber solution from Example K11 and 13.6 g/h of a 0.8 molar solution of (n-butyl)(sec-butyl)magnesium in heptane, which had been diluted with toluene in a weight ratio of 1:4 were metered continuously into the stirred-tank reactor, with stirring at 100 rpm, and the mixture was stirred at a constant temperature of 95.6° C.

The solution was conveyed onward into a 4-liter tower reactor provided with two heating zones of equal size. The internal temperature was controlled to 128° C. in the first zone and 159.5° C. in the second zone. The discharge from the reactor was mixed with 11 g/h of a 50% strength by weight solution of methanol in water, and passed through a mixer and then through a tubular section heated to 240° C., and then passed, with pressure reduction, via a pressure-control valve into a low-pressure vessel operated at 10 mbar. The melt was discharged using a screw and pelletized.

After a short time constant operating conditions became established. The solids content at the exit from the first reactor was 34.9% by weight. Quantitative conversion was found at the exit from the continuous system. The polystyrene matrix had a molar mass Mw of 173,000 g/mol and a polydispersity Mw/Mn of 3.06. The distribution was monomodal.

The styrene content and ethylbenzene content determined were each below 5 ppm. The material had a yield stress of 24.7 N/mm$^2$, a hole notched impact strength of 13.3 kJ/m$^2$, a heat distortion temperature (Vicat B/50) of 91.4° C. and a melt flow index of 5.8 cm$^3$/10 min. at 200° C.

Example H10

A double-walled 1.9 l stirred-tank reactor with a standard anchor stirrer was used for the continuous polymerization. The reactor was designed for a pressure of 25 bar and was temperature-controlled with a heat-transfer medium for isothermal polymerization. 376 g/h of styrene, 665 g/h of the rubber solution from Example K12 and 14.5 g/h of a 0.8 molar solution of (n-butyl)(sec-butyl)magnesium in heptane, which had been diluted with toluene in a weight ratio of 1:4 were metered continuously into the stirred-tank reactor, with stirring at 100 rpm, and the mixture was stirred at a constant temperature of 100.5° C.

The solution was conveyed onward into a 4-liter tower reactor provided with two heating zones of equal size. The internal temperature was controlled to 120.9° C. in the first zone and 160° C. in the second zone. The discharge from the reactor was mixed with 11 g/h of a 50% strength by weight solution of methanol in water, and passed through a mixer and then through a tubular section heated to 240° C., and then passed, with pressure reduction, via a pressure-control valve into a low-pressure vessel operated at 10 mbar. The melt was discharged using a screw and pelletized.

After a short time constant operating conditions became established. The solids content at the exit from the first reactor was 35% by weight. Quantitative conversion was found at the exit from the continuous system. The polystyrene matrix had a molar mass Mw of 158,000 g/mol and a polydispersity Mw/Mn of 3.40. The distribution was monomodal.

The styrene content and ethylbenzene content determined were each below 5 ppm. The material had a yield stress of 24.2 N/mm$^2$, a hole notched impact strength of 11.8 kJ/m$^2$, a heat distortion temperature (Vicat B/50) of 84.7° C. and a melt flow index of 6.6 cm$^3$/10 min. at 200° C.

Example H11

A double-walled 1.9 l stirred-tank reactor with a standard anchor stirrer was used for the continuous polymerization. The reactor was designed for a pressure of 25 bar and was temperature-controlled with a heat-transfer medium for isothermal polymerization. 361 g/h of styrene, 688 g/h of the rubber solution from Example K13 and 14 g/h of a 0.8 molar solution of (n-butyl)(sec-butyl)magnesium in heptane, which had been diluted with toluene in a weight ratio of 1:4 were metered continuously into the stirred-tank reactor with stirring at 100 rpm, and the mixture was stirred at a constant temperature of 93.6° C.

The solution was conveyed onward into a 4-liter tower reactor provided with two heating zones of equal size. The internal temperature was controlled to 122° C. in the first zone and 158.6° C. in the second zone. The discharge from the reactor was mixed with 11 g/h of a 50% strength by weight solution of methanol in water, and passed through a mixer and then through a tubular section heated to 240° C., and then passed, with pressure reduction, via a pressure-control valve into a low-pressure vessel operated at 10 mbar. The melt was discharged using a screw and pelletized.

After a short time constant operating conditions became established. The solids content at the exit from the first reactor was 35.9% by weight. Quantitative conversion was found at the exit from the continuous system. The polystyrene matrix had a molar mass Mw of 188,000 g/mol and a polydispersity Mw/Mn of 2.98. The distribution was monomodal.

The styrene content and ethylbenzene content determined were each below 5 ppm. The material had a yield stress of 29.6 N/mm$^2$, a hole notched impact strength of 14.9 kJ/m$^2$, a heat distortion temperature of (Vicat B/50) of 92° C. and a melt flow index of 4.6 cm$^3$/10 min. at 200° C.

Table 3 shows a comparison of measurements on compression-molded (DIN 16770—Part 1) and injection-molded (ISO 3167) test specimens. The values for yield stress in compression-molded test specimens are generally from 20 to 30% below those measured on injection-molded test specimens, and those for elongation at break are generally at from 10 to 30% below. The values of hole notched impact strength measured on compression-molded test specimens are generally from 30 to 40% below those for injection-molded test specimens.

TABLE 3

Comparison of measurements on compression-molded (DIN 16770 - Part 1) and injection-molded (ISO 3167) test specimens

| Example<br>Rubber | | H4<br>Example<br>K6 | H5<br>Example<br>K7 | H8c<br>Example<br>K10 |
|---|---|---|---|---|
| Yield stress | [N/mm$^2$] | 24/33 | 25/36 | 26/33 |
| Elongation at break | [%] | 24/28 | 20/25 | 25/27 |
| Hole notched impact strength | [kJ/m$^2$] | 12/17.5 | 12/21 | 15/22 |
| Melt volume rate | [cm$^3$/10 min.] | 6.2/6.4 | 5.5 | 5.6/5.4 |
| Heat distortion temperature Vicat B/50 | [° C.] | 92/89 | 89/90.5 | 93/93 |

We claim:

1. An impact-modified polystyrene which has been obtained by polymerization of styrene in the presence of an asymmetric anionically polymerized styrene-butadiene-styrene three-block copolymer with a styrene content of from 5 to 75% by weight, wherein a polymerization of said three-block copolymer is carried out in the presence of an organic alkali metal compound, and wherein a polymerization of styrene is carried out in the presence of a trialkylaluminum compound and/or dialkylmagnesium compound.

2. An impact-modified polystyrene as claimed in claim 1, which has a disperse soft phase with cell-particle morphology and comprising a styrene-butadiene-styrene three-block copolymer.

3. An impact-modified polystyrene as claimed in claim 1, which has been obtained by anionic polymerization of styrene in the presence of a styrene-butadiene styrene three-block copolymer with a styrene content of from 25 to 50% by weight.

4. An impact-modified polystyrene as claimed in claim 1, wherein a specimen produced to ISO 3167 has a yield stress of at least 24 Mpa, measures at 23° C. to DIN 53455, and a hole notched impact strength of at least 11 kJ/m$^2$, measured at 23° C. to DIN 53753.

5. An impact-modified polystyrene as claimed in claim 1, which has been obtained by anionic polymerization of styrene in the presence of an asymmetric styrene-butadiene-styrene three-block copolymer $S_1$-B-$S_2$, where $S_1$ is a styrene block with a weight-average molar mass $M_w$ of from 5000 to 100000 g/mol, B is a butadiene block with a weight-average molar mass $M_w$ of from 12000 to 500000 g/mol and $S_2$ is a styrene block with a weight-average molar mass $M_w$ of from 30000 to 300000 g/mol.

6. An impact-modified polystyrene as claimed in claim 1, wherein the content of styrene monomers is not more than 50 ppm and the content of styrene dimers and styrene trimers is not more than 500 ppm.

7. An impact-modified polystyrene as claimed in claim 1, wherein the content of ethyl benzene is below 5 ppm.

8. An impact-modified polystyrene as claimed in claim 1, which has a magnesium content of from 0.1 to 100 mmol/kg and/or an aluminum content of from 0.01 to 50 mmol/kg, in each case based on the impact-modified polystyrene.

9. An impact-modified styrene as claimed in claim 1, comprises from 0.1 to 10% by weight of mineral oil.

10. A process for preparing impact-modified polystyrene by polymerization of styrene in the presence of a rubber, which comprises using, as rubber, an asymmetric anionically polymerized styrene-butadiene-styrene three-block copolymer with a styrene content of from 5 to 75% by weight, wherein a polymerization of said three-block copolymer is carried out in the presence of an organic alkali metal compound, and wherein a polymerization of styrene is carried out in the presence of a trialkylaluminum compound and/or dialkylmagnesium compound.

11. A process for preparing impact-modified polystyrene as claimed in claim 10, wherein the polymerization of styrene is carried out in the presence of a trialkylaluminum compound and/or dialkylmagnesium compound.

12. A process for preparing impact-modified polystyrene as claimed in claim 10, where the polymerization is carried out in toluene as solvent.

13. A fiber, a film or a molding produced from impact-modified polystyrene as claimed in claim 1.

* * * * *